May 23, 1950 J. RINNE 2,508,800
EQUIPMENT FOR SALVAGING SUBMERGED OBJECTS
Filed July 28, 1947 6 Sheets-Sheet 3
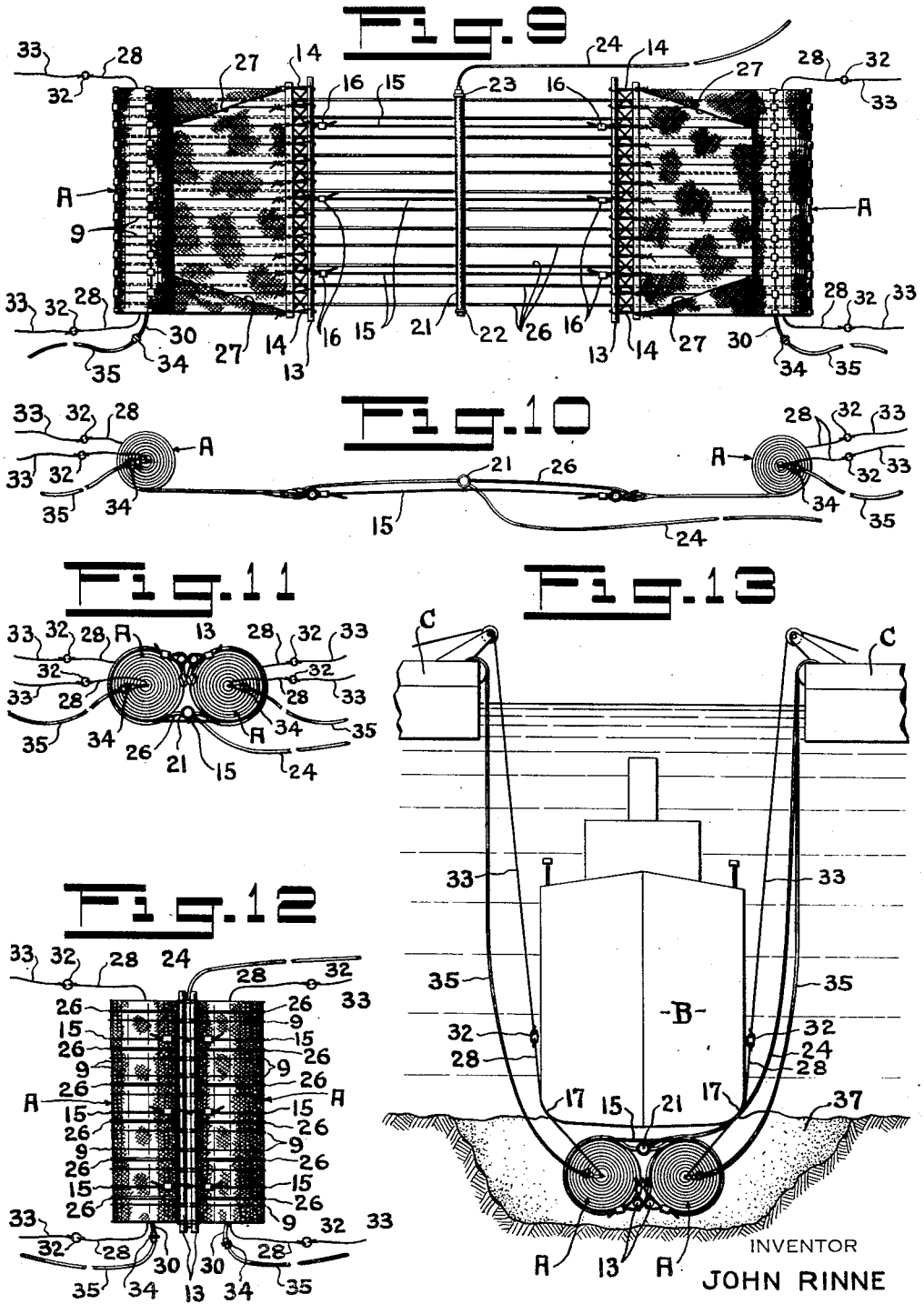
INVENTOR
JOHN RINNE
BY 
ATTORNEY May 23, 1950 J. RINNE 2,508,800
EQUIPMENT FOR SALVAGING SUBMERGED OBJECTS
Filed July 28, 1947 6 Sheets-Sheet 4
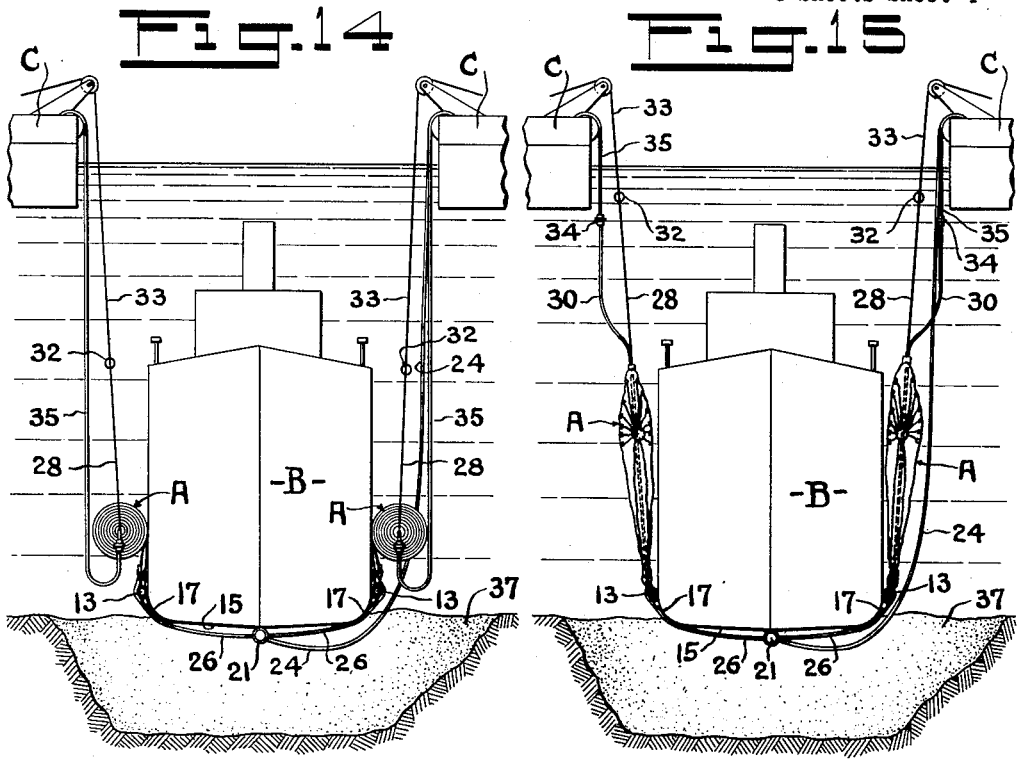
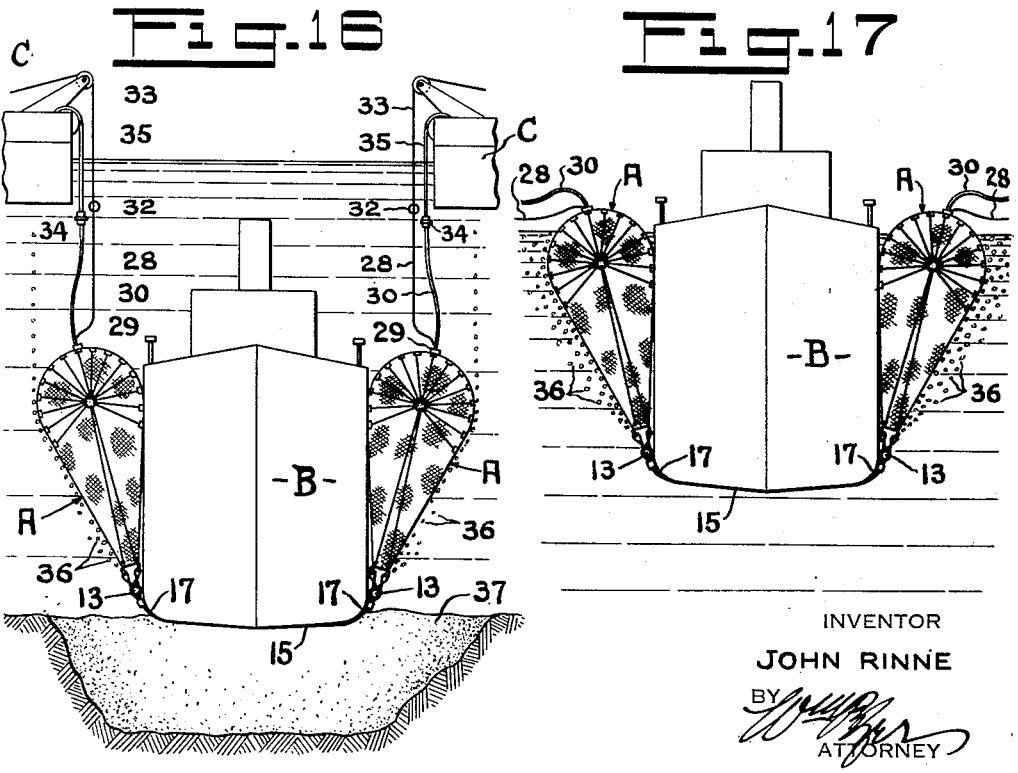
INVENTOR
JOHN RINNE
BY 
ATTORNEY May 23, 1950  J. RINNE  2,508,800
EQUIPMENT FOR SALVAGING SUBMERGED OBJECTS
Filed July 28, 1947  6 Sheets-Sheet 5
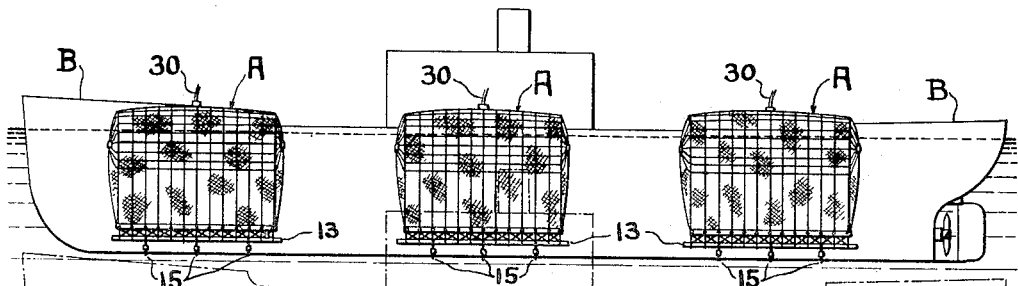
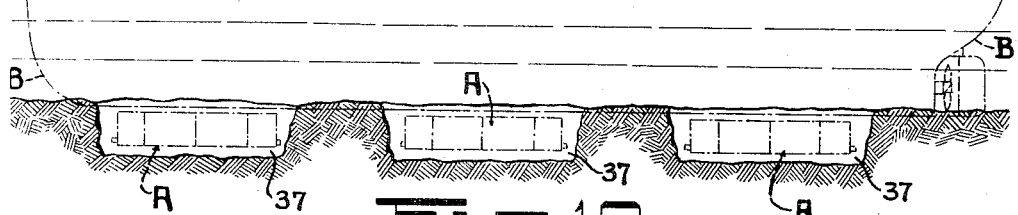
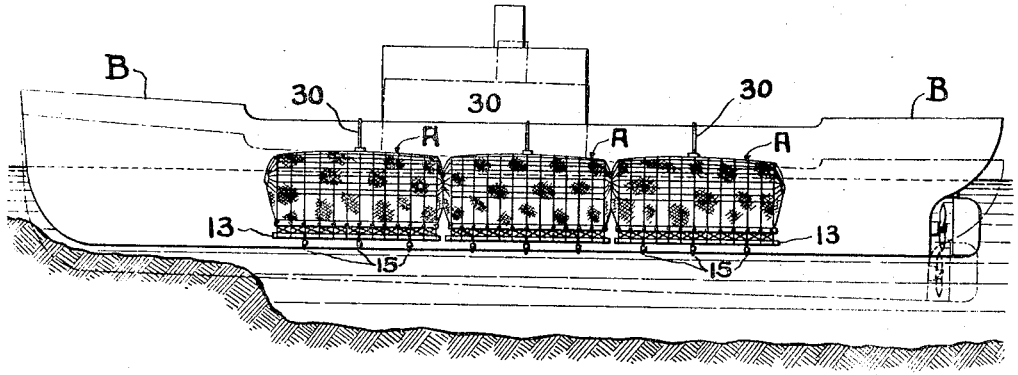
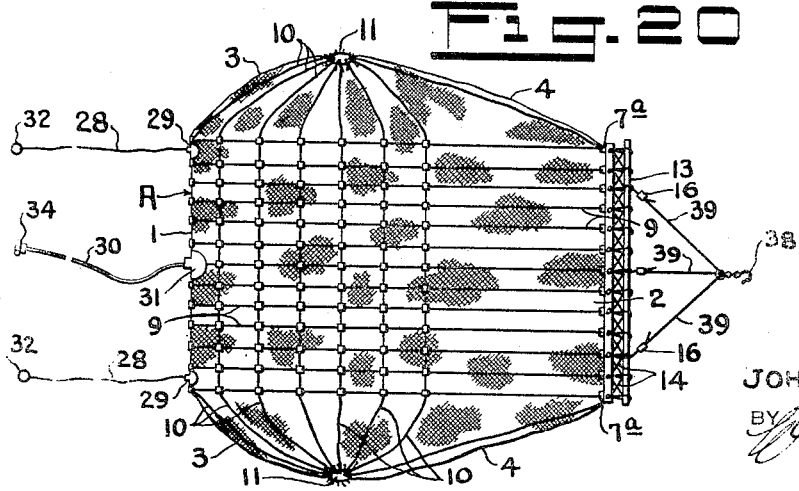
INVENTOR
JOHN RINNE May 23, 1950  J. RINNE  2,508,800
EQUIPMENT FOR SALVAGING SUBMERGED OBJECTS
Filed July 28, 1947                                6 Sheets-Sheet 6
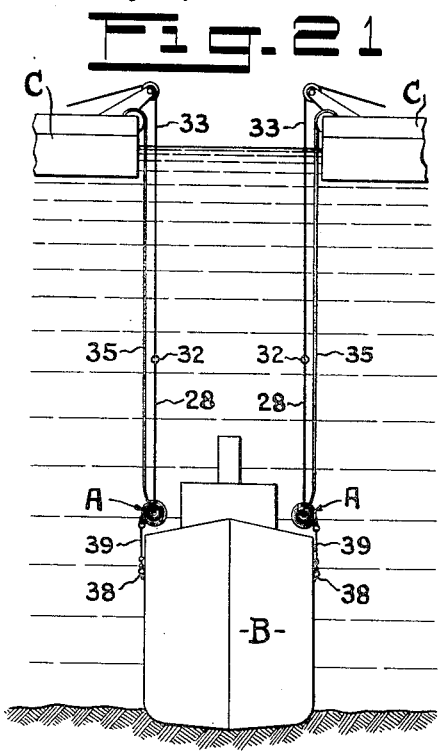
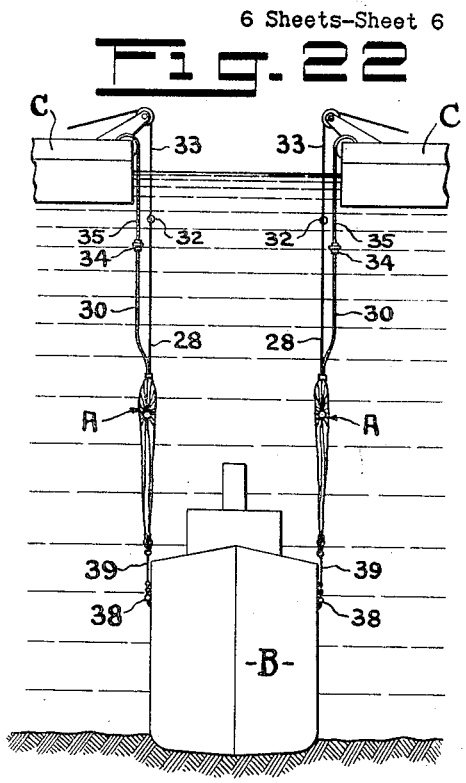
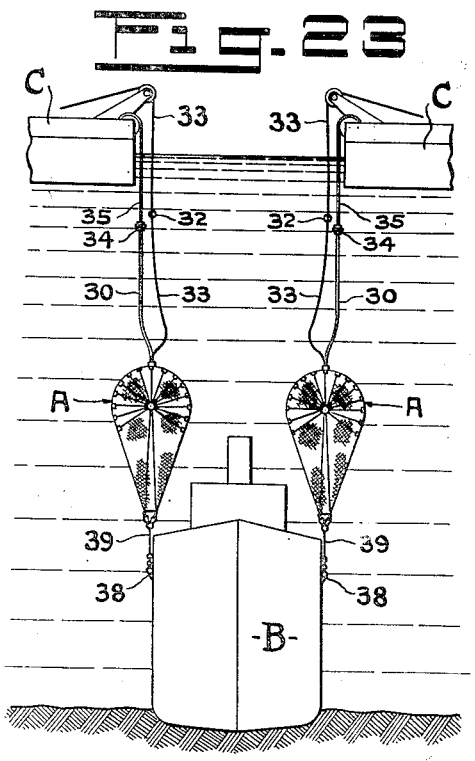
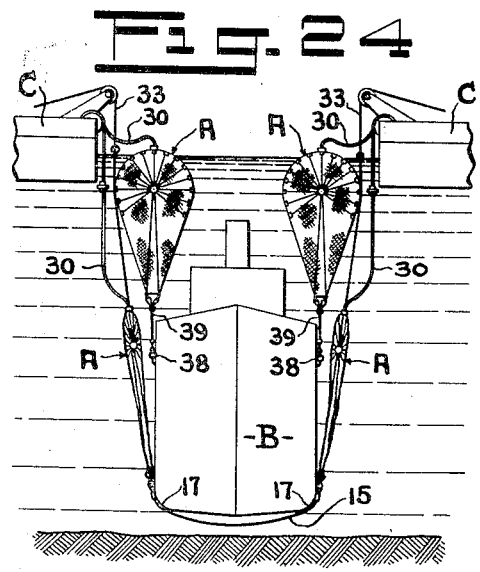
INVENTOR
JOHN RINNE
ATTORNEY Patented May 23, 1950

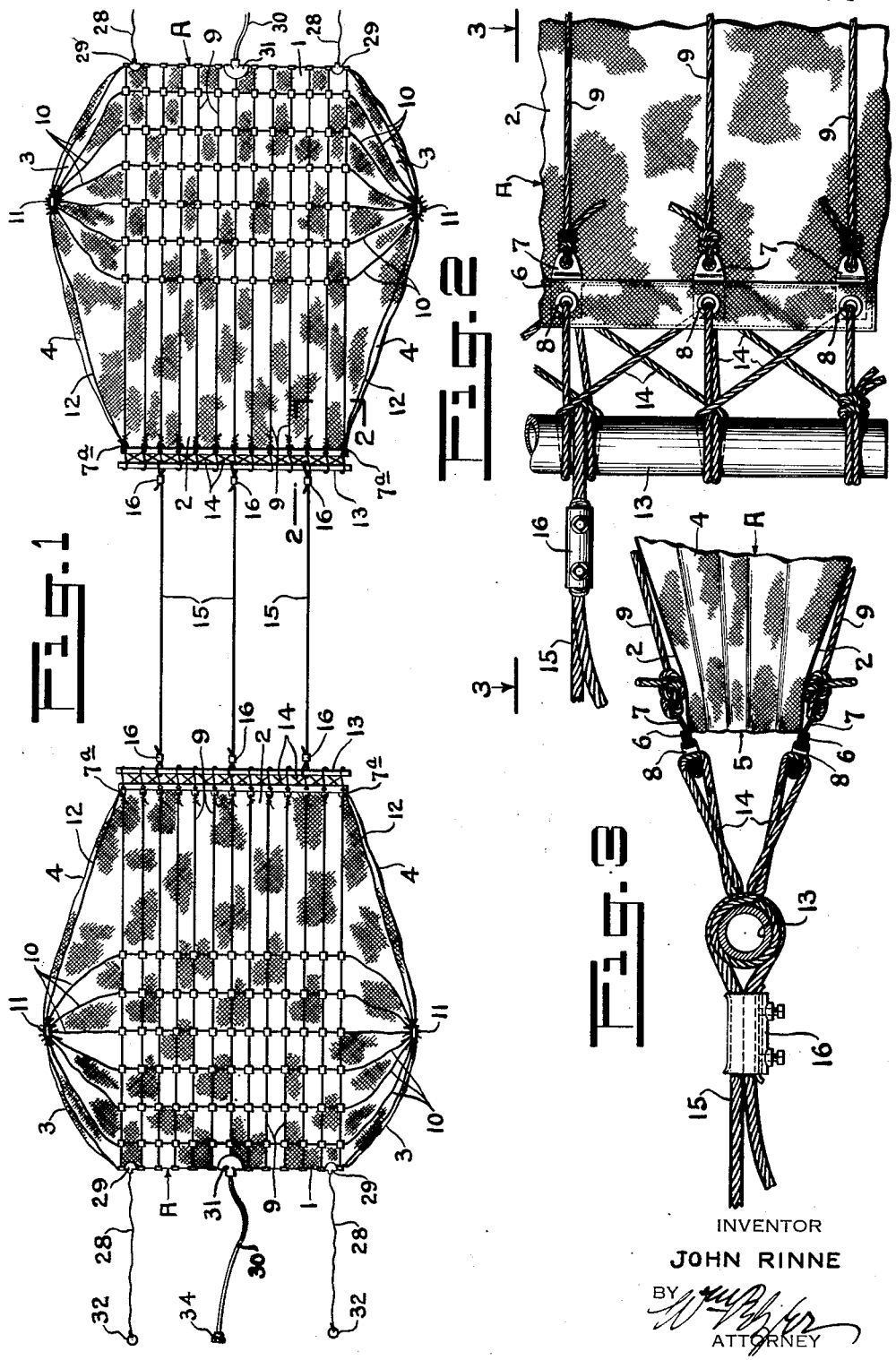

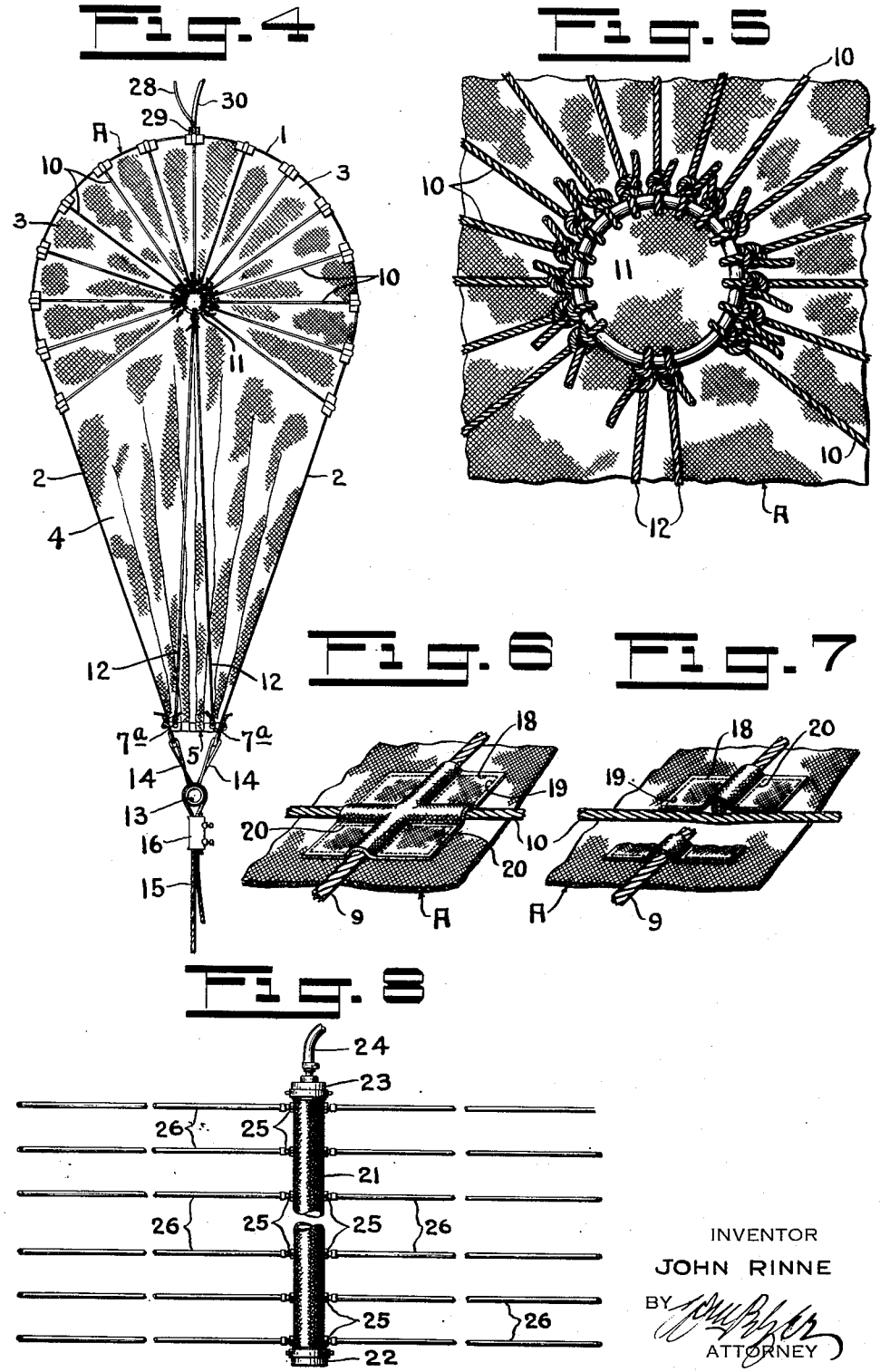

2,508,800

UNITED STATES PATENT OFFICE 2,508,800

EQUIPMENT FOR SALVAGING SUBMERGED OBJECTS

John Rinne, Brooklyn, N. Y.

Application July 28, 1947, Serial No. 764,117

11 Claims. (Cl. 114—54)

This invention relates to the raising of sunken ships or other objects by applying inflatable bags or balloons to create sufficient buoyance to raise the submerged object. Heretofore it has been proposed to employ closed bags or balloons provided with outlet ports controlled by relief valves and means for regulating the supply of inflating medium for avoiding the creation of excessive pressure within the enclosure as it rises and the external pressure thereon decreases.

That method of controlling the inflated bags is unsatisfactory for the reason that a time element is involved due to the restricted relief port area and due to the fact that the rate of lift or rise may vary or change suddenly, and therefore the external pressure on the air bag and flow through its relief valve becomes irregular as the bag rises causing irregular and rapid variations in internal pressure relative to the external pressure, and hence resulting in sudden stress and rupture of the lifting tackle, excessive pressure on the relief valve, and bursting of the bag.

The object of my invention is to avoid these liabilities and to provide more practical and efficient equipment for performing salvaging operations; to dispense with pressure relief valves on the bags or balloons; to maintain automatically a constantly uniform and definite ratio of internal inflating pressure to external water pressure as the bag rises toward the surface; to provide salvaging equipment that may be more readily applied to submerged objects; to provide equipment which may be readily applied to the hull of a ship to cover leaks and prevent sinking; to provide equipment for such purposes that may be readily carried by all ships for emergency purposes and readily applied by a ship's crew; to provide buoyancy bags which are not liable to burst due to excessive internal pressure; and to provide equipment for practicing the method disclosed in my application for patent Serial No. 733,795, filed March 11, 1947.

In carrying the invention into effect I employ an envelope capable of retaining or trapping a buoyancy medium under water and which envelope when immersed and charged with the buoyancy medium at the required pressure will effect a buoyant body having a relatively large open area at the bottom or underside for constant and unrestricted escape of excessive trapped air or other buoyancy medium at the rim of the envelope in direct proportion to the pressure of the inflating medium over the water pressure at any depth, and whereby a predetermined constant ratio of internal and external pressure on the envelope may be automatically maintained throughout its rise toward the surface.

In the preferred form I provide collapsible bags or balloons having preferably a spherical or cylindrical upper part and extending downward in truncated cone or wedge-like form and adapted to be folded or rolled into a bundle for storage or to facilitate submersion for attachment to the object to be raised, and adapted for automatic unfurling and inflation by the buoyancy medium. These bags or balloons will have an unrestricted and relatively large open lower end for constant and uncontrolled escape of buoyancy medium in direct proportion to the constant decrease in external water pressure relative to the inflating pressure as the bag rises, and thereby maintaining a uniform predetermined pressure of the buoyancy medium within the bag at all times relative to the depth of immersion. Each bag will be provided with an inlet port and coupling for an air or gas supply line. The bag is confined within a network of ropes the ends of which are secured to a spreader-rod suspended by lacing ropes and shroud lines below the open end of the bag, and which lacing ropes and shroud lines will be of a length to be held at an angle to the plane of the bag opening when attached to a submerged object and thereby facilitate the maintenance of the fully open condition of the bag by the pressure of the inflating medium. To the spreader-rod are attached sling lines from which a lifting hook or equivalent device is suspended, or a series of hogging lines are connected between the spreader-rods of a pair of bags to permit hauling under the hull of a sunken ship for simultaneous lifting effect on both sides of the ship. To the bags are coupled main and auxiliary air supply lines and the necessary hauling lines for drawing the bags into position for attachment to the sunken object or under the hull of a ship. In practice the bags may be of any practical shape, capacity and area to provide the required buoyancy and adapt them for specific operating conditions. For operations in relatively shallow waters the area or spread of the bag may be large relative to its depth to provide the necessary buoyancy.

The invention is illustrated in the accompanying drawings, in which,

Figure 1 is a plan view of a pair of bags, the main or upper sections of which are semi-cylindrical in form with spherical ends and tapering into truncated form with full open lower ends, and showing the bags laced to spreader-rods and connected together by hogging lines, and each bag having an air-line connection and hauling lines for guiding the bags into position for use.

Figure 2 is an enlarged plan view of a section of the bag on the line 2—2 of Figure 1 illustrating the spreader-rod and lacing ropes for the open end of the bag and a hogging line connection.

Figure 3 is a side view of the bag section shown in Figure 2 looking in the direction of the arrows 3—3 illustrating the spreader-rod and rope lacing connection to the network for facilitating maintenance of the full opening at the lower end of the inverted bag.

Figure 4 is an enlarged side elevation of one of the bags shown in Figure 1 illustrating the use of a ring for connecting the ends of the laterally extending ropes of the bag network.

Figure 5 is an enlarged view of the ring and connecting ropes shown in Figure 4.

Figures 6 and 7 are enlarged views showing the crossing of the longitudinal and lateral ropes of the bag network and a web at the crossing points secured to the bag material.

Figure 8 is a schematic illustration of an air distributor tube having flexible hose outlets for insertion into the open ends of a pair of coupled bags when coupled together by hogging lines and preparatory to folding or rolling the bags into shape for lowering and hauling under the hull of a ship, and which distributor and outlets are provided for preliminary supply of inflating medium for buoyancy to raise the folded bags against the hull after being hauled under the ship and to start automatic unrolling of the bags against the hull and drawing the hogging lines taut under and against the hull.

Figures 9 and 10 are plan and edge views, respectively, illustrating the distributor tube and hose outlets in position between a pair of bags, partly rolled or folded with the air supply and hauling line connections extending laterally from the rolls, and Figure 9 showing the end sections of the bags folded inward over the longitudinal sides of the bags.

Figures 11 and 12 are end and plan views, respectively, of a pair of bags fully rolled preparatory to storing or lowering to a ship or other submerged object to be raised.

Figure 13 is a schematic illustration of a sunken ship resting on its bottom and showing the removal of the river bottom at a section of the hull and a pair of furled bags under the hull in position for preliminary inflation to raise the hogging lines and bags against the hull and to unfurl the bags and draw the hogging lines taut under the hull, and also showing a pair of operation pontoons.

Figures 14 to 17 are schematic views illustrating successive stages in the operation of raising a sunken ship; Figure 14 showing the bags after the start of unrolling and the hogging lines stretched across the underside of the hull; Figure 15 showing the bags fully unrolled and partly inflated by the supply of air from the auxiliary air supply line through the distributor tube into the open ends of the bags, now partly filled with water, preparatory to hauling the auxiliary air supply line and distributor tube aboard one of the pontoons; Figure 16 showing the condition after the auxiliary air supply line and distributor tube are entirely removed, and the main air supply to both bags in operation, showing the bags fully inflated, the hogging lines drawn taut under the hull, the water expelled from the bags, and air bubbles showing escape of excess air from the open bottoms of the bags; and Figure 17 showing the ship raised to the limit of the operation with the bags showing at the surface under minimum external water pressure and maximum escape of air from the open ends of the bags as indicated by the increase of air bubbles.

Figure 18 is a view illustrating the application of a series of lifting bags along the length of a ship that had been resting on a level bottom as shown in broken lines and showing the removal of river bottom at several points under hull sections for hauling lifting bags into position for inflation.

Figure 19 is a view illustrating the application of a series of lifting bags in close proximity along the length of a ship the bow of which had been resting on a shelving bottom.

Figure 20 is a plan view of a bag like that of Figure 1, but having a lifting hook suspended from sling lines attached to the spreader-rod.

Figures 21 to 23 are views similar to Figures 14 to 16 showing the application of the arrangement of Figure 20 to the raising of a ship; and Figure 24 is a view illustrating the combination of both methods of applying the lifting bags to a sunken ship particularly after towing into shallow water where divers may readily place in position the type of bags shown in Figure 1 to raise the ship's superstructure above water level as shown in Figures 17 and 18.

Referring to the drawings and more particularly to Figures 1 to 5, the inflatable bags are indicated generally by the letter A. These bags as will be understood may be made of any suitable flexible material, such as canvas and preferably waterproofed, and may be of any suitable shape, preferably curved over the upper surface when inflated. The preferred shape when inflated is a semi-cylindrical or parabolic upper section 1 with flat tapering sides 2, presenting a wedge-shaped body as seen in Figure 4. The end sections as indicated in Figure 1 are preferably composed of semi-spherical upper sections 3 with straight or tapering lower sections 4. The upper section 1 and side sections 2 will preferably be of continuous length in one piece or a number of strips according to the width and desired air capacity of the bag. The end sections 3 and 4 will necessarily be composed of suitably shaped pieces and strips to provide the semi-spherical upper part 3 and the straight or tapering lower part 4. When assembled the bag sections 1—4 will form an open-ended bag having an opening 5, Figures 3 and 4, approximately rectangular in shape and of large area relative to the capacity of the bag as indicated in Figures 1 and 3. This open end as will be apparent by reference to Figure 1 will be of a length equal to the width of the bag side sections 2, and the width of the opening will depend upon the capacity of the bag and length of sling lines, thus presenting a large opening relative to the cross-sectional area of the bag at its major axis, and thereby providing an unrestricted outlet for constant escape of inflating medium at the rim of the bag in definite ratio to the constant decrease in external water pressure as the bag rises toward the surface.

The ends of the bag sections 2 are turned over outwardly and given a double fold as seen at 6, Figures 2 and 3, and under the fold at spaced intervals eye-plates 7 are set and interlocked with grommets 8 which bind the folded edge and eye-plates together. Each bag is enclosed within a rope network consisting of longitudinal encircling ropes 9 and laterally encircling ropes 10. Ropes 9 are each tied to a plate 7, as seen in Figure 2, and the lateral ropes 10 are tied to a pair of centering rings 11, as shown in Figures 4 and 5, located at the major axis of the bag, and each ring being held centered by a pair of shroud lines 12 secured to the end eye-plates 7ª, Figures 1 and 4. The ends of the bag sections 2 are laced to a spreader-rod 13 by ropes 14 which are laced through the grommets 8 and looped around the rod at points in alignment with the grommets, eye-plates and net ropes 9, as seen in Figure 2, thus securing each net rope 9 to the spreader-rod. It will be noted that by securing the eye-plates between the fold 6 by means of the grommets the lifting strain is taken up directly by ropes 9, the eye-plates and grommets through lacing ropes 14 and spreader-rod 13, and that no strain is placed on the bag material thereby. Spaced on the spreader-rod are a number of hogging lines 15 which in practice are secured by clamping sleeves 16, Figure 3, and similarly secured to the spreader-rod of another bag A as seen in Figure 1 for lifting effect on the bottom of a ship's hull from both sides of the ship as shown in Figures 14 to 17. These hogging lines may by the use of clamps 16 be adjusted to provide varying spread to extend across the bilge at any section of a ship B, or the hogging lines may readily be replaced by lines of necessary length to insure adjustment of the spreader-rods approximately at the bilge lines 17 of a ship when the bags are in position for unfurling as seen in Figure 14; also to insure pressure of the bags against the sides of the ship when fully inflated; also to avoid contraction or closure of the ends of the bags by being held against the curvature of the hull at the bilge line 17; and to insure proper functioning of the spreader-rod for maintaining the bag ends at full opening as indicated in Figures 16 and 17.

In Figures 6 and 7 are shown the manner of connecting the longitudinal and lateral ropes of the bag network together and to the bag. In those figures, A indicates the bag material, 9 one of the longitudinal net ropes and 10 one of the lateral ropes. These ropes cross over each other and at the points of crossing a patch 18 of bag material, or other suitable reinforcing material, is secured to the bag material by stitching 19 at the marginal edges of the patch, and cross stitching 20 adjacent the ropes, without binding the ropes to each other or to the bag material so that while the bag is confined within the network there may be relative movement when the bag is inflated and thus avoid strain and ripping of the bag material.

In Figure 8 is shown the distributor tube 21 for distributing the auxiliary air supply to a pair of bags after being placed in position under the hull of a ship. This tube is shown as having a closure cap 22 at one end and a hose coupling cap 23 at the other end to which auxiliary air line 24 is coupled preparatory to lowering the bags to the submerged vessel. These caps are interchangeable so that the air hose may be coupled to either end of the tube 21 to suit operating conditions. Pipe 21 will be of a length approximately equal to the width of bag sides 2. A series of air outlets 25 are provided on opposite sides of the tube, suitably spaced to provide a sufficient number of outlets for the width of the bag and to these outlets are coupled open-ended lengths of hose 26 each of a length to extend within the open ends of the bags a sufficient distance to insure the supply of air for completing the unfurling of the bags after being raised against the hull of the ship as shown in Figure 14.

The distributor tube and hose outlets are not secured to the bags A or hogging lines 15, the tube being loosely placed across the hogging lines as seen in Figures 9 and 10 with the ends of the hose outlets extending within the bags. The end sections 3—4 of the bags preparatory to folding or rolling are folded over the side sections 2 as indicated at 27 in Figure 9, and as each bag is folded from the top end toward the open end the network folds in between the layers of the bag, and the hogging lines will wind around the outside of the folded bag. When completely rolled or folded, as shown in Figure 11, the distributor tube 21 will lie on the hogging lines and the hose outlets 26 will extend around the outer surface of the rolls between the hogging lines as seen in Figure 12.

Each bag is provided with a pair of hauling line connections 28 secured at the upper closed end of the bag and preferably near the side margins of section 1 by means of saddles 29, and also an air line connection 30 rigidly connected to a saddle 31 secured air-tight to the top center of the bag, Figure 1. The connections 28 are provided with shackles 32 for coupling the hauling lines 33, and hose connections 30 are provided with pipe couplings 34 for connection of the main air supply lines 35. When a pair of bags are folded or rolled the hauling and air line connectors 28 and 30 will extend laterally from the bags as shown in Figures 9 and 12. The purpose of the short connections 28 and 30 is to facilitate coupling of the hauling and air lines without unfurling the bags preparatory to lowering to the object to be raised. When a pair of rolled bags are placed in position for lowering to a sunken ship the auxiliary air line 24 is connected to distributor tube 21 and the hauling lines 33 and air line 35 for one of the pair of bags are coupled, respectively, to connectors 28 and 30, and the pair of bags are then lowered to the side of the sunken ship in position to be drawn under the hull. The hauling lines 33 and air line 35 for connection to the other bag of the pair are then lowered down the opposite side of the ship and hauled under the hull by a diver and coupled to connectors 28 and 30, whereupon the pair of coupled bags are hauled under the ship to the position shown in Figure 13 preparatory to beginning the unfurling operation.

The furled bags are lowered to the side of the sunken ship with the hogging lines 15 adjacent the hull so that when drawn under the hull the air distributor tube 21 will be under the hogging lines between the furled bags as shown in Figure 13. Thus when the bags are unfurled by the auxiliary air pressure to the extent of unwinding the hogging lines and causing them to extend entirely across the hull bottom and up to the bilge line 17, as seen in Figure 14, and subsequent unfurling of the bags, as shown in Figure 15, the air distributor tube with its hose outlets and air line 24 are free to be hauled from under the ship and aboard the pontoon. It will be noted that by lowering the pair of bags for placement under the hull with the hogging lines adjacent the hull as shown in Figure 13 the bags will be free to unroll against the sides of the ship when air is forced into them as indicated in Figure 14.

The auxiliary air supply for unfurling the bags will be of a pressure sufficient to automatically raise the furled bags up against the hull of a ship and cause the bags to unwind and stretch the hogging lines 15 and hose outlets 26 under the ship, and with the aid of the hauling lines 33 the unfurled bags will be guided into contact with the ship's sides as seen in Figures 14 and 15. When the bags due to the auxiliary air pressure are unfurled and raised to the position of Figure 15, the auxiliary air line and distributor tube with its hose outlets are hauled aboard the operation pontoon C from which the auxiliary air supply line 24 extends. The main air supply to the bags is then started to fully inflate the bags and drive out any water remaining therein and cause them to press firmly against the sides of the ship as they expand as shown in Figure 16.

As the bags become fully inflated with air at the desired volume and pressure to provide the required buoyancy, the air supply may be discontinued as the bag rises, and since the air pressure necessarily exceeds the water pressure on the inflated bag the excess air pressure causes the automatic escape of air from the fully open end 5 of the bag as indicated by the air bubbles 31 in Figure 16. As the buoyancy of the bags cause the ship to rise, the air pressure within the bags results in a greater difference of internal air pressure over the external water pressure causing a greater escape of air from the bags to compensate for the decreasing water pressure as the bags rise toward the surface. This is indicated by the increase of air bubbles as shown in Figure 17, and the expansion and escape of air from the bags will be directly proportional to the rate of rise until the bags reach the surface of the water where the external pressure against the volume of confined air is at the minimum. To accomplish this automatic pressure adjustment while maintaining the maximum lifting power, the opening of the underside or bottom of the envelope or bag must have an area so large relative to its capacity that the air escape at the rim of the bag as it rises will constantly be in direct proportion to the constantly decreasing external pressure. Thus it will be seen that by providing a relatively large area of escape, as distinguished from a valve controlled escape port, the element of time to permit the escape of the necessary volume (the approximate discharge rate being the whole volume of the bag per every thirty-three feet of rise as measured in free air) for maintaining a constant ratio of internal air and external water pressure is practically eliminated, and that therefore all danger of sudden increased pull and strain on the lifting tackle and bursting of the bag is avoided.

In Figures 18 and 19 are shown the application of a series of inflated bags A along the sides of a ship B. When a sunken ship B is resting on its bottom throughout its length as indicated in broken lines, Figure 18, a series of earth removals 37 are made under the hull and suitably spaced relative to the length of the ship to permit hauling a series of furled bags A under the ship as indicated in broken lines for distributing the lifting effect as deemed necessary. Where the bow of a sunken ship B is resting on a shelving bottom as indicated in broken lines in Figure 19, a series of lifting bags A may be closely applied at the waist of the ship to provide the necessary lifting power.

The lifting bags may be individually applied to the object to be raised and for such use a hook 38 is attached to the spreader-rod 13 by a series of sling lines 39 spaced along the rod as shown in Figure 20. The bag A for this purpose may be of the same shape as shown in Figures 1 and 4, or may be fully spherical in the upper part and cylindrical or of truncated conical form in the lower part, especially when employed for raising objects other than ships. However, the form shown in Figures 1 and 4 is preferred for general use since a straight spreader-rod 13 is preferable for maintaining the discharge opening 5 at full opening when the bag is inflated under water, and for the reason that said form with a straight spreader-rod is better adapted for folding or rolling and unfurling, and better suited for storage when not in use. When the bag is of spherical-truncated form a spreader-ring may be employed instead of a straight rod for maintaining the bag opening 5 at full opening when inflated.

When employing bags having lifting hooks 38, the bags will be individually applied instead of in pairs as indicated in Figure 21 with the hook engaging a suitable opening in the hull or a shackle secured to the hull. Bags having hooks 38 will be in folded or furled form and hauled into position by hauling lines 33 for coupling to the object to be raised as shown in Figure 21 and will be unfurled and extended by the air pressure applied at the top of the bag through supply line 35 as shown in Figure 22, and then fully inflated for raising the ship B as shown in Figure 23. Bags provided with lifting hooks are adapted for application to one side of a sunken ship for use in righting and maintaining the ship in righted position preparatory to placing other bags in position for raising the ship.

Under certain conditions it may be desirable to apply both lifting bag arrangements as illustrated in Figure 24. For instance when it is desired to raise the ship a sufficient height to permit towing to shallow water or more suitable position to facilitate salvaging operations or to enable divers to more readily apply lifting bags coupled in pairs by hogging lines as shown in Figure 24 to eventually raise the ship's superstructure above the water level. In this procedure the bags with lifting hooks are applied first and inflated for partial raising of the ship as shown in Figure 24 and then pairs of bags coupled by hogging lines are hauled into position, unfurled and extended as shown, and then inflated for further raising of the ship. In case of necessity both sets of bags may be applied at once in which case the bottom would be cleared under the ship as in Figure 13, and the combined buoyancy employed for raising the ship from the bottom.

What I claim is:

1. An inflatable body for use in raising submerged objects, comprising an envelope adapted for expansion under water, an inlet for inflating medium, said envelope having an open area of variable spread under which the inflating medium is trapped by the surrounding water, means suspended from said envelope for attachment to the object to be raised, and said open area being automatically variable, and said means being so proportioned to said area to permit unrestricted variation in the spread of said open area and constant escape of inflating medium under the rim of the envelope in volume directly proportional to the decreasing water pressure throughout the rise of the envelope toward the surface.

2. An inflatable body for use in raising submerged objects, comprising an envelope having an automatically variable opening for escape of inflating medium, an inlet for inflating medium, a network within which the envelope is confined, means suspended from said network for attachment to the object to be raised, and said suspension means having a length permitting maximum unrestricted spread of the envelope by the inflating medium and constant escape of inflating medium at the rim of the envelope proportional to variations in water pressure on the envelope.

3. An inflatable body for use in raising submerged objects, comprising an open-ended bag of flexible material, the area of the opening being large relative to the capacity of the bag and automatically variable by the pressure of the inflating medium, an inlet for inflating medium, a network in which the bag is confined, means suspended from the network for attachment to the object to be raised, said suspension means having a length permitting minimum to maximum opening of the bag by the inflating medium and constant unrestricted escape of inflating medium at the rim of the bag proportional to variations in pressure thereon.

4. An inflatable body for use in raising submerged objects, comprising an open-ended bag of flexible material, the area of the opening being large relative to the capacity of the bag and automatically variable by the pressure of the inflating medium, an inlet for inflating medium, a network in which the bag is confined, means attached to the rim of the bag to which said network is secured, means suspended from said first-named means for assisting in effecting the variable opening of the bag by the inflating medium, and sling lines depending from said last-named means for attachment to the object to be raised.

5. A bag for use in raising submerged objects, comprising an open-ended body of flexible material, the area of the open end being large relative to the capacity of the bag and automatically variable by the pressure of the inflating medium, an inlet at the closed end of the bag for admitting inflating medium, a network within which the bag is confined, means suspended from said network having a length equal to the greater dimension of the bag opening, a suspension between the network and said means of a length to permit variable spread of the bag opening, and sling lines depending from said means for attachment to the object to be raised.

6. A bag for use in raising submerged objects, comprising an open-ended body of flexible material having a semi-cylindrical upper section extending in truncated conical form to the open end, the area of the open end being large relative to the capacity of the bag and automatically variable by the pressure of the inflating medium, an inlet for admitting inflating medium at the closed end of the bag, a network within which the bag is confined, a rod suspended below the bag opening by suspension lines extending from the network on opposite sides of the bag and of a length equal to the width of the bag opening, and sling lines depending from said rod for attachment to the object to be raised.

7. In equipment for raising submerged vessels, the combination of a pair of open-ended inflatable bags, the area of the openings being automatically variable by the pressure of the inflating medium, and each confined in a network, a rod suspended from each bag, a suspension between said rod and bag permitting variable spread of the bag opening, cables connected between said rods and adapted to extend under the hull of a vessel, and hauling lines attached to the bags for hauling the bags into position adjacent the hull.

8. In equipment for raising submerged vessels, the combination of a pair of open-ended inflatable bags, the area of the openings being automatically variable by the pressure of the inflating medium, and each confined in a network, a rod suspended from each bag, a suspension between said rod and bag permitting variable spread of the bag opening, cables connected between said rods and adapted to extend under the hull of a vessel, hauling lines attached to the bags for hauling the bags into position adjacent the hull, and inlets at the closed ends of the bags for admitting inflating medium.

9. In equipment for raising submerged vessels, the combination of a pair of open-ended inflatable bags having air inlets at the closed ends for inflation, and the area of the open ends of said bags being automatically variable by the pressure of the inflating medium, cables coupling the bags and adapted to extend under the hull of a vessel, hauling lines attached to the bags for hauling the bags into position under the hull of the vessel, said bags and cables being adapted for furling preparatory to hauling into position, a removable air distributor supported between the furled bags for supplying air to unfurl the bags, and air supply line connections for unfurling and inflating the bags.

10. A bag for use in raising submerged objects, comprising an open-ended body of flexible material, an inlet at the closed end of the bag for admitting inflating medium, the area of the open end of the bag being large relative to the capacity of the bag and automatically variable by the pressure of the inflating medium, eye-plates secured at the rim of the bag, a network secured to said eye-plates within which the bag is confined, and means suspended from said eye-plates for attachment to the object to be raised.

11. A bag for use in raising submerged objects, comprising an open-ended body of flexible material, an inlet at the closed end of the bag for admitting inflating medium, the area of the open end of the bag being large relative to the capacity of the bag and automatically variable by the pressure of the inflating medium, eye-plates secured at the rim of the bag by grommets, a network secured to said eye-plates within which the bag is confined, means suspended from said grommets for assisting in maintaining the open spread of the bag, and sling lines suspended from said means for attachment to the object to be raised.

JOHN RINNE.

REFERENCES CITED

The following references are of record in the file of this patent:

UNITED STATES PATENTS

| Number | Name | Date |
| --- | --- | --- |
| 92,854 | Maquay | July 20, 1869 |
| 259,937 | Spearing | June 20, 1882 |
| 350,184 | Benninger | Oct. 5, 1886 |
| 906,716 | Jelpo | Dec. 15, 1908 |
| 1,000,903 | Elia | Aug. 15, 1911 |
| 1,364,646 | Ryan | Jan. 4, 1921 |
| 2,420,384 | Shep | May 13, 1947 |